(12) United States Patent
Parisel et al.

(10) Patent No.: US 8,114,944 B2
(45) Date of Patent: Feb. 14, 2012

(54) OLEFIN POLYMERISATION PROCESS

(75) Inventors: Marc Parisel, Vilvoorde (BE); Brent Walworth, Sint-Niklaas (BE)

(73) Assignee: Ineos Manufacturing Belgium NV, Antwerp (BE)

( * ) Notice: Subject to any disclaimer, the term of this patent is extended or adjusted under 35 U.S.C. 154(b) by 0 days.

(21) Appl. No.: 12/736,864

(22) PCT Filed: May 18, 2009

(86) PCT No.: PCT/EP2009/055973
§ 371 (c)(1),
(2), (4) Date: Jan. 10, 2011

(87) PCT Pub. No.: WO2009/141296
PCT Pub. Date: Nov. 26, 2009

(65) Prior Publication Data
US 2011/0105702 A1  May 5, 2011

(30) Foreign Application Priority Data

May 20, 2008 (EP) ..................................... 08156532

(51) Int. Cl.
*C08F 2/12* (2006.01)
*C08F 6/24* (2006.01)
*B01D 43/00* (2006.01)

(52) U.S. Cl. ........................ 526/65; 526/920; 528/502 D

(58) Field of Classification Search ..................... 526/65, 526/920; 528/502 D
See application file for complete search history.

(56) References Cited

U.S. PATENT DOCUMENTS 6,586,537 B2 * 7/2003 Marissal et al. ................ 526/70

FOREIGN PATENT DOCUMENTS

EP   1 118 626 A1   7/2001
WO   WO 2006/044149 A1   4/2006

* cited by examiner

*Primary Examiner* — Fred M Teskin
(74) *Attorney, Agent, or Firm* — Nixon & Vanderhye

(57) ABSTRACT

Continuous process for manufacturing a polyolefin resin in at least two reactors in which in a first polymerization reactor, an olefin is polymerized continuously in the presence of a catalyst and a diluent to produce a first suspension comprising the diluent and polyolefin particles. At least a portion of the first suspension is transferred from the first polymerisation reactor to a second polymerisation reactor where further polymerisation takes place. A further suspension containing diluent and polymer particles is withdrawn from the second reactor and transferred to two separators, in each of which separators a diluent-rich flow and a concentrated suspension of polyolefin particles are formed and separated. The diluent-rich flow from one separator is recycled to a reactor preceding the second reactor, and the diluent-rich flow from the other separator is recycled to the second reactor. The invention enables higher separator efficiencies to be achieved.

13 Claims, 1 Drawing Sheet

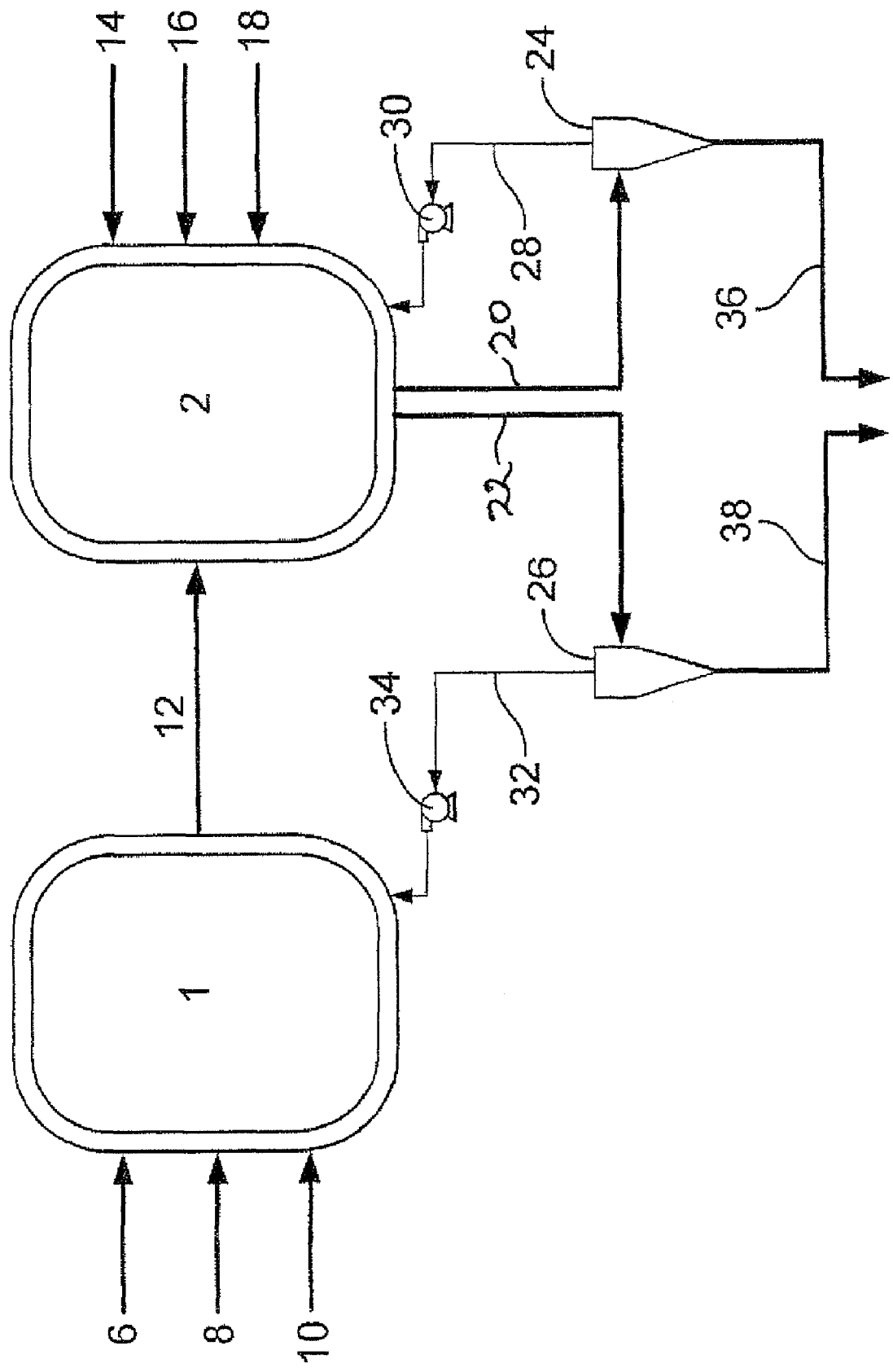

OLEFIN POLYMERISATION PROCESS

This application is the U.S. national phase of International Application No. PCT/EP2009/055973 filed 18 May 2009 which designated the U.S. and claims priority to 08156532.7 filed 20 May 2008, the entire contents of each of which are hereby incorporated by reference.

The present invention relates to a continuous process for manufacturing a polyolefin resin in two or more reactors. The invention also relates to a reactor system for carrying out the process.

BACKGROUND OF THE INVENTION

The manufacture of polyolefin resins by continuous polymerisation in a diluent has been known for a long time. Generally, continuous processes comprise the continuous introduction of an olefin, a catalyst and a diluent into a polymerisation reactor and the continuous removal from this reactor of a suspension comprising polyolefin particles and the diluent. In multiple reactor polymerisations, the suspension is then introduced into a second reactor, optionally with additional diluent and/or catalyst, where further polymerisation takes place.

It is known to treat the suspension continuously withdrawn from any reactor with a concentrator device, which separates the suspension into a solids-rich portion and a diluent-rich portion. The diluent-rich portion may be recycled to the reactor, whilst the solids-rich portion is transferred to a subsequent reactor, or if it has come from the final reactor, to the next stage of the process. A concentration step is particularly valuable after the final reactor in the process, as the polymer needs to be separated from the diluent after this stage, and increasing the solids concentration reduces the amount of diluent which needs to be flashed off.

In the case of reaction systems employing a plurality of reactors in series, it is known for the diluent-rich stream from one reactor to be recycled to a previous reactor. In EP 1118625A, a process for manufacturing a polyolefin in two polymerisation reactors is described in which a concentrator device, in this case a hydrocyclone, separates a suspension continuously withdrawn from the first reactor and recycles the diluent-rich stream to the reactor, whilst passing the solids-rich stream to a second reactor. A suspension continuously withdrawn from the second reactor is separated by a further hydrocyclone, and the diluent-rich stream from the further hydrocyclone is also recycled to the first reactor, whilst the solids-rich stream is passed to a further treatment unit to separate the polymer. The recycled diluent-rich streams generally contain the finest particles of solid polymer. Recycling them into the polymerisation reactors makes it possible to increase their residence time in the reactors so as to increase their size.

When a diluent-rich stream is recycled from a concentrator device to a reactor, the amount of extra diluent which is introduced into the reactor is reduced correspondingly, in order to maintain the solids concentration in the reactor at the same level. However there is generally a minimum rate at which extra diluent needs to be added: this helps to maintain flexibility, and permits the required flushing of equipment such as unused inlet and outlet lines, feed lines and safety equipment. This minimum in turn imposes a maximum limit on the amount of diluent-rich stream which can be recycled. However it is also desired to maximise the concentration of the solids-rich stream as mentioned above, which obviously results in a greater quantity of diluent in the diluent-rich stream. Accordingly, it is desirable to increase the concentration of the solids-rich stream until the amount of diluent-rich stream being recycled is at its maximum allowed limit. This is effectively the maximum efficiency which is imposed on the concentrator in this arrangement.

It should be noted that there is also a maximum theoretical solids concentration for the solids-rich stream, which is the concentration at which the solid particles are packed together as closely as possible. The exact value of the maximum concentration depends in the size distribution and shape of the polymer particles, the density of the solid and the density of the diluent.

SUMMARY OF THE INVENTION

It is possible to pass the suspension withdrawn from a reactor to two concentrators operating in parallel. If the suspension is withdrawn from the second of two reactors operating in series, the diluent-rich stream from both concentrators can be recycled either to the first or second reactor. However we have found that the maximum efficiency of the concentrators can be increased if the diluent-rich stream from one concentrator is recycled to the first reactor, and the diluent-rich stream from the other concentrator is recycled to the second reactor.

Accordingly in a first aspect the present invention provides a continuous process for manufacturing a polyolefin resin in at least two reactors in series, in which:
in a first polymerisation reactor, an olefin is polymerised continuously in the presence of a catalyst and a diluent to produce a first suspension comprising the diluent and polyolefin particles;
at least a portion of said first suspension is transferred from the first polymerisation reactor to a second polymerisation reactor where further polymerisation takes place;
a further suspension comprising diluent and polymer particles is withdrawn from the second reactor and transferred to two separators, in each of which separators a diluent-rich flow and a concentrated suspension of polyolefin particles are formed and separated,
wherein the diluent-rich flow from one separator is recycled to a reactor preceding the second reactor, and the diluent-rich flow from the other separator is recycled to the second reactor.

Each separator may be in the form of two or more individual separation devices, although it is preferred that it comprises just one device. Preferably one or more of the separators is a hydrocyclone separator. For the purposes of the present invention, the term "hydro cyclone separator" is intended to denote any apparatus which, under the action of a centrifugal force, makes it possible to separate from a suspension of solid particles, on the one hand a liquid flow depleted in solid particles, and on the other hand a flow concentrated in solid particles. Such items of apparatus are well known and are described in particular in Perry's Chemical Engineers' Handbook, McGraw-Hill 7th Edition, 1997, pages 19-24 to 19-28. Each separator may optionally be in the form of a number of hydrocyclone separators mounted in series.

Usually substantially all of the first suspension is transferred from the first polymerisation reactor to the second polymerisation reactor.

In the present invention, the term "polyolefin" is intended to denote both the homopolymers of an olefin and the copolymers of an olefin with one or more other olefins or other comonomers that are copolymerizable with the olefin.

The olefin used in the polymerisation step of the process according to the invention is generally chosen from olefins containing from 2 to 12 carbon atoms, and mixtures thereof. The olefin is preferably chosen from 1-olefins containing from 2 to 8 carbon atoms, more particularly from ethylene, propylene, 1-butene, 1-methylpentene, 1-hexene and 1-octene, and mixtures thereof. The olefin used in the second polymerisation reactor is the same as that used in the first polymerisation reactor.

Apart from the olefin, at least one other comonomer that is copolymerizable with the olefin may be used so as to manufacture copolymers. The comonomers are usually chosen from conjugated or unconjugated olefins and diolefins, containing from 2 to 12 atoms. The 1-olefins containing from 2 to 8 carbon atoms as described above give good results. When one or more comonomers are used, it is preferred to use the same comonomer(s) in both polymerisation reactors. In the case where comonomer is added to the polymers produced in both reactors, the amounts of comonomer used in the two reactors are preferably controlled such that the comonomer/olefin molar ratio in the second polymerisation reactor is between 50% and 150% by weight of the comonomer/olefin molar ratio in the first polymerisation reactor. If one of the polymers is a homopolymer, any stream recycled to that reactor may be treated to remove any residual comonomer.

The diluent used in the process according to the invention may be anything which is liquid under the polymerisation conditions and in which most of the polymer formed is insoluble under the polymerisation conditions. Hydrocarbons are suitable diluents. Aromatic and aliphatic cyclic hydrocarbons containing from 5 to 12 carbon atoms, such as toluene and cyclohexane, are suitable. Preferred diluents are acyclic aliphatic hydrocarbons containing from 3 to 8 carbon atoms, such as pentane and hexane. Propane and isobutane are particularly preferred. However the term "diluent" as used herein is intended to mean all of the liquid present, not only any of the above compounds which are added specifically to function as a diluent. For example, ethane formed in the reaction, or residual monomer or comonomer may all be present in liquid form, and any of the liquids may of course contain dissolved therein other components such as hydrogen or impurities coming from the feed.

In one embodiment, the diluent may be the olefin itself maintained in liquid form under its saturation pressure. In another embodiment, the diluent may be maintained in its supercritical state.

The polymerisation is carried out in the presence of a catalyst. Any catalyst allowing the polymerisation of olefins may be used. Examples of such catalysts which may be mentioned are catalysts of the Ziegler type, vanadium-based or chromium-based catalysts, metallocene catalysts and catalysts based on transition metals from groups 8 to 12 of the Periodic Table of the Elements. These catalysts may be supported on an inorganic or polymeric support. Good results have been obtained with a chromium catalyst supported on a support comprising silica.

The polymerisation carried out in the second reactor is preferably carried out without any fresh catalyst being added to the reactor. Generally, the suspension of polyolefin particles introduced into the second polymerisation reactor still contains enough active catalyst from the first reactor to enable the polymerisation to continue. However fresh catalyst may be added if required. Fresh olefin may also be added if required.

In the polymerisations carried out in both reactors, additional compounds may be present such as cocatalysts and agents for regulating the molecular mass, eg hydrogen.

When a cocatalyst is added, it is preferably added only to the first polymerisation reactor.

When a regulating agent such as hydrogen is added, it is preferable to add the same regulating agent into both polymerisation reactors. The amounts of regulating agent are usually adjusted such that the molar ratio of regulating agent to olefin in the second polymerisation reactor is between 50% and 150% of the regulating agent/olefin molar ratio in the first polymerisation reactor. Preferably, the molar ratio of regulating agent to olefin is substantially the same in both polymerisation reactors. However it is also possible to make different compositions in the two reactors, in which case the molar ratio of regulating agent to olefin in the two reactors can be different.

The polymerisation reactions carried out in the two reactors may take place under a variety of temperature and pressure conditions. The polymerisation is generally carried out at a temperature of from 20° C. to 150° C., preferably from 25° C. to 130° C. Usually, the polymerisation is carried out at a pressure of from $10^5$ Pa to $100 \times 10^5$ Pa, preferably from $10 \times 10^5$ Pa to $55 \times 10^5$ Pa.

Usually, when the same product is made in the two reactors, the difference between the polymerisation temperatures in the two reactors does not exceed 3° C., and preferably it does not exceed 1° C. However when different products are made in the two reactors, the temperatures may differ by 5 to 25° C.

The invention includes within its scope embodiments in which the first and second reactors are not the first and last reactors in a polymerisation process. Thus the first reactor of the invention may receive a polymer-containing suspension from a further reactor in which polymerisation has already taken place. The concentrated suspension withdrawn from the separators attached to the second reactor may be transferred to a further reactor where polymerisation continues. The invention also includes within its scope the possibility of an additional polymerisation reactor being interposed between the first and second reactors, in which additional polymerisation takes place. In this case the suspension withdrawn from the first reactor first passes into the additional reactor, where further polymerisation takes place: a suspension withdrawn from the additional reactor is introduced into the second reactor, and the diluent-rich stream obtained therefrom is recycled to both the second reactor and either the first reactor or another reactor preceding the second reactor in accordance with the invention.

The suspension is preferably withdrawn continuously from the first polymerisation reactor.

In addition to the diluent introduced to each reactor as part of the recycled diluent-rich stream, extra diluent is also added to each reactor, preferably continuously. It is preferred that the rate of addition of this extra diluent to each reactor is less than 50 wt % of the rate of withdrawal of diluent from that reactor, and more preferably less than 10 wt %. Preferably the rate of addition of recycled diluent (from the diluent-rich flow) to each reactor is at least 20 wt % of the rate of withdrawal of diluent from that reactor, and more preferably between 30 wt % and 99 wt %. In the case where a particular reactor is not the first reactor in which polymerisation takes place, in addition to the above two sources of diluent the reactor will also receive diluent as part of the suspension transferred thereto from the previous reactor. More generally, the extra diluent added to the particular reactor may either be added direct to the reactor, or it may be added either to the suspension transferred from the previous reactor or to the suspension recycled via a separator before it enters the particular reactor.

The polymerisation carried out in the first reactor is carried out in the presence of polyolefin particles recycled into the first reactor from the second reactor via the separator. The proportion of polyolefin particles recycled into the first reactor is generally at least 0.2%, typically at least 2% and more often at least 10% by weight relative to the total weight of polyolefin particles transferred from the first reactor to the second reactor. However the objective of the invention is to maximise the solids concentration of the solids-rich stream withdrawn from the separator, so it is preferred that the proportion of polyolefin particles recycled into the first reactor is no more than 50 wt %, preferably no more than 40 wt % relative to the total weight of polyolefin particles transferred from the first reactor to the second reactor.

Similarly, the proportion of polyolefin particles recycled into the second reactor is no more than 50 wt %, preferably no more than 40 wt % and more preferably no more than 30 wt % relative to the total weight of polyolefin particles transferred from the first reactor to the second reactor.

The suspension withdrawn from the second reactor usually comprises, in addition to the diluent and the polyolefin particles, other compounds introduced to or formed in the second reactor. Thus the diluent withdrawn from the second reactor usually contains compounds present or formed in the reactor which are soluble in the diluent, such as unreacted olefin.

The respective amounts of polyolefin manufactured in the two reactors may vary within a wide range. Generally, the amount of polyolefin manufactured the first reactor is between 20% and 80% by weight, preferably between 30% and 70% by weight, of the total amount of polyolefin produced in the two reactors. Similarly, the amount of polyolefin manufactured in the second reactor is between 20% and 80% by weight, preferably between 30% and 70% by weight, of the total amount of polyolefin produced in the two reactors.

The concentrated suspension formed in the separators is withdrawn therefrom, and the polyolefin particles present therein are then usually separated from the suspension. The polyolefin particles may be separated out by any known method. Usually, they are separated from the majority of the diluent by subjecting the concentrated suspension to a treatment under pressure and temperature conditions that are capable of flashing off at least some of the diluent. Subsequent to this treatment, the polymer particles contain only a small amount of residual diluent and may then be dried by any known means, for example by heating in a drier.

For example, the concentrated suspension may be subjected to a pressure reduction to a pressure below $5 \times 10^5$ Pa. The diluent flashed off may then be recondensed by compression in order to be reused in the polymerisation process. Before reusing it, the diluent is usually subjected to a purification so as to remove the majority of the olefin and any other compounds present. After purification, the diluent may be reintroduced as extra diluent into either or both of the first and second reactors.

Alternatively, the concentrated suspension may be subjected to a pressure reduction under temperature and pressure conditions which ensure the flashing off of most of the diluent, but which are such that the subsequent cooling of the diluent allows it to be recondensed without it needing to be recompressed. The temperature at which the pressure reduction is carried out is generally between 50° C. and 90° C. In order to adjust the temperature at which the pressure reduction is carried out, it is sometimes advantageous to heat the concentrated suspension taken from the separator by means of a line heater. The pressure at which the pressure reduction is carried out is generally between $5 \times 10^5$ Pa and $20 \times 10^5$ Pa. This variant of the process has the advantage that the diluent thus separated from the polymer particles may be recondensed by simple cooling without a compression step. This variant of the process is particularly advantageous when a diluent which has a boiling point at atmospheric pressure of less than about 25° C. is used.

The polymerisation reactor is preferably any reactor functioning continuously, such as reactors of stirred-tank type or reactors of loop type. Good results have been obtained with loop reactors.

In the process according to the invention, the diluent-rich flows taken from the separators may be recycled into each of the reactors by exploiting a pressure difference prevailing in the reactor. More particularly, when the polymerisation reactor is of the loop type, the diluent-rich flow may be recycled to the reactor by exploiting the pressure difference prevailing upstream and downstream of the system for stirring the loop reactor. However it is possible using a circulation pump to create a sufficient pressure difference between the reactor exit and the location in the reactor where the diluent-rich stream is reintroduced. The pump may be mounted either on the line transferring the withdrawn suspension from the reactor to the concentrating device or more preferably downstream of the concentrating device on the line recycling the diluent-rich stream into the reactor. There may also be a pump on the line transferring the solids-rich flow to the downstream equipment.

It is also possible to heat or cool the streams entering the separators if required, as well as the solids-rich stream if necessary.

BRIEF DESCRIPTION OF THE DRAWING

The invention is further described with reference to the accompanying FIGURE, in which:

The FIGURE shows diagrammatically one particular arrangement which can be used to carry out the process according to the invention. In the scheme in the FIGURE, a polymerisation reactor 1 receives feeds of olefin (6), diluent (8) and catalyst (10). Polymerisation takes place in the reactor, and a suspension comprising polyolefin particles and diluent, formed in reactor 1, is transferred via line 12 to a second polymerisation reactor 2. Reactor 2 can also receive extra diluent via line 16, fresh olefin via line 18, and fresh catalyst via line 14. Both reactors may additionally receive separate feeds of comonomer if required (lines not shown). A suspension comprising polymer, diluent and other components is withdrawn from reactor 2 via two lines 20, 22 and transferred to two separators, typically hydrocyclones, 24 and 26. In each hydrocyclone is formed a concentrated suspension of polymer particles and a diluent-rich stream. The concentrated suspension of polymer particles is withdrawn from each hydrocyclone via lines 36 and 38, from where it is transferred to the next stage of the process, such as a flash vessel in order to remove most of the remaining diluent. The diluent-rich stream from hydrocyclone 24 is recycled to reactor 2 via line 28, assisted by pump 30. The diluent-rich stream from hydrocyclone 26 is recycled to reactor 1 via line 32, assisted by pump 34.

In all the Examples below, the minimum required input of extra diluent into each reactor is 5000 kg/h, which determines the maximum amount of diluent which can be recycled to that reactor. Solids, diluent properties and hydrocyclone geometry are assumed to be the same, so that the performance of the hydrocyclone (solids in the diluent-rich stream and in the solids-rich stream) can be calculated as a function of the inlet flow.

EXAMPLES

The Examples below are based on the arrangement shown on the FIGURE in which the overall production rate is 40000 kg/h divided equally between both reactors, with a solids concentration of 40% in both reactors. The reactor slurry has a density of 450 kg/m³ and the polymer density is 950 kg/m³.

The conditions are given in Table 1 below. As mentioned above, the minimum fresh diluent flow to each reactor is required to be maintained at 5000 kg/h. The maximum tolerated solids concentration in the solids-rich stream is limited to 68%. In order to simplify the mass balance, it is assumed that no comonomer is present in the reactor.

Examples 1 and 2 are comparative examples in which the diluent-rich stream is recycled to both first and second reactors. Examples 3 and 4 demonstrate the significant benefit of the present invention.

Example 1

Comparative

In this Example, the two reactors of the FIGURE are producing polymer at the rate of 20000 kg/hr each, with a solids concentration of 40 wt %. This Example demonstrates the theoretical efficiency of the two hydrocyclones when all of the diluent-rich stream separated by the hydrocyclones is recycled to the first reactor. In this case, the flow through line 20 to hydrocyclone 24 is zero. All other flows are shown in Table 1 below.

TABLE 1

| | | |
|---|---|---|
| Reactor 1 diluent input flow 8 | kg/h | 5080 |
| Reactor 1 solids content | wt % | 40.0 |
| Reactor 1 production rate of solid polymer | kg/h | 20000 |
| Line 12 liquid flow | kg/h | 50390 |
| Line 12 solid flow | kg/h | 33600 |
| Reactor 2 diluent input flow 16 | kg/h | 28790 |
| Reactor 2 solids content | wt % | 40.0 |
| Reactor 2 production rate of solid polymer | kg/h | 20000 |
| Line 22 liquid flow | kg/h | 80390 |
| Line 22 solid flow | kg/h | 53590 |
| Line 22 solids content | wt % | 40.0 |
| Diluent-rich Reactor 1 recycle from hydrocyclone 26: | | |
| Line 32 liquid flow | kg/h | 45090 |
| Line 32 solid flow | kg/h | 13590 |
| Line 32 solids content | wt % | 23.2 |
| Solids-rich stream from hydrocyclone 26: | | |
| Line 38 liquid flow | kg/h | 35300 |
| Line 38 solid flow | kg/h | 40000 |
| Line 38 solids content | wt % | 53.1 |

In this Example, both reactors are operating at a production rate of 20000 kg/h and a solids concentration of 40 wt %. Since all of the reaction mixture is withdrawn from Reactor 2 into hydrocyclone 26, the solids concentration of the material entering the hydrocyclone is also 40 wt %. The efficiency of the hydrocyclone is measured by the solids concentration of the solids-rich suspension which is withdrawn through line 38, since this shows how much the hydrocyclone has increased the concentration of the suspension from the original 40 wt %. This in turn is dictated by the amount of solid and diluent which can be recycled to Reactor 1 in the diluent-rich stream 32.

There are two limitations controlling the amount of solid and diluent which can be recycled to Reactor 1. First, there is the requirement that at least 5000 kg/h of fresh diluent is added to each reactor, which restricts that amount of diluent that can be recycled. Second there is the restriction that the solids concentration in the reactor is required to be 40 wt %, and the reactor is producing solid at the rate of 20000 kg/h. The total diluent present in reactor 1 comprises the recycled diluent from line 32 plus the 5000 kg/h of fresh diluent, whilst the total solid in reactor 1 comprises the recycled solid from line 32 plus the 20000 kg/h of newly produced solid. Thus the amount of diluent and solid in the recycled stream through line 32 must be such that the above total solid in reactor 1 constitutes 40 wt % of the above total diluent+solid in reactor 1.

The result of the above restrictions is shown in Table 1. 45090 kg/hr liquid containing 13590 kg/hr of solid is recycled through line 32, which means that the flow transferring from reactor 1 to reactor 2 through line 12 contains 50390 kg/hr of diluent and 33600 kg/hr of solid, which is a solids concentration of 40.0 wt %. An additional 20000 kg/hr of solid polymer is produced in reactor 2, which means that 28790 kg/hr of fresh diluent must be added to reactor 2 via line 16 in order to maintain the solids concentration at 40.0 wt %.

Accordingly, the efficiency of the hydrocyclone in this Example is shown by the fact that it is able to increase the solids concentration of the stream exiting the reactor system via line 38 from 40.0 wt % to 53.1 wt %. However this efficiency has been limited by the requirement to add a minimum of 5000 kg/h of extra diluent to the first reactor. Without this restriction, the hydrocyclone would be capable of further increasing the solids concentration of the solids-rich stream.

Example 2

Comparative

This Example is the same as Example 1, except that all of the diluent-rich stream separated by the hydrocyclones is recycled to the second reactor. Accordingly, the flow through line 22 to hydrocyclone 26 is zero. All other flows are shown in Table 2 below.

TABLE 2

| | | |
|---|---|---|
| Reactor 1 diluent input flow 8 | kg/h | 28790 |
| Reactor 1 solids content | wt % | 40.0 |
| Reactor 1 production rate of solid polymer | kg/h | 20000 |
| Line 12 liquid flow | kg/h | 30000 |
| Line 12 solid flow | kg/h | 20000 |
| Reactor 2 diluent input flow 16 | kg/h | 5080 |
| Reactor 2 solids content | wt % | 40.0 |
| Reactor 2 production rate of solid polymer | kg/h | 20000 |
| Line 20 liquid flow | kg/h | 80390 |
| Line 20 solid flow | kg/h | 53590 |
| Line 20 solids content | wt % | 40.0 |
| Diluent-rich Reactor 2 recycle from hydrocyclone 24: | | |
| Line 28 liquid flow | kg/h | 45090 |
| Line 28 solid flow | kg/h | 13590 |
| Line 28 solids content | wt % | 23.2 |
| Solids-rich stream from hydrocyclone 24: | | |
| Line 36 liquid flow | kg/h | 35300 |
| Line 36 solid flow | kg/h | 40000 |
| Line 36 solids content | wt % | 53.1 |

In the above case it can be seen that the final result, a solids concentration of the stream exiting the reactor system of 53.1 wt %, is the same as in Example 1. However in this case 28300 kg/hr of fresh diluent needs to be added to reactor 1 since there is no recycled diluent, and the flow transferring from reactor 1 to reactor 2 through line 12 contains 30000 kg/hr of diluent and 20000 kg/hr of solid. Furthermore, similarly to Example 1, the efficiency of the hydrocyclone has been limited by the requirement to add a minimum of 5000 kg/h of extra diluent to the second reactor.

Example 3

This Example is the same as Examples 1 and 2, except that the diluent-rich stream separated by the hydrocyclones is recycled to the both reactors in accordance with the present invention. Thus in this case, both hydrocyclones are required to be used. All flows are shown in Table 3 below.

TABLE 3

| | | |
|---|---|---|
| Reactor 1 diluent input flow 8 | kg/h | 16940 |
| Reactor 1 solids content | wt % | 40.0 |
| Reactor 1 production rate of solid polymer | kg/h | 20000 |
| Line 12 liquid flow | kg/h | 40200 |
| Line 12 solid flow | kg/h | 26800 |
| Reactor 2 diluent input flow 16 | kg/h | 16940 |
| Reactor 2 solids content | wt % | 40.0 |
| Reactor 2 production rate of solid polymer | kg/h | 20000 |
| Line 20 liquid flow | kg/h | 40200 |
| Line 20 solid flow | kg/h | 26800 |
| Line 20 solids content | wt % | 40.0 |
| Line 22 liquid flow | kg/h | 40200 |
| Line 22 solid flow | kg/h | 26800 |
| Line 22 solids content | wt % | 40.0 |
| Diluent-rich Reactor 1 recycle from hydrocyclone 26: | | |
| Line 32 liquid flow | kg/h | 22550 |
| Line 32 solid flow | kg/h | 6800 |
| Line 32 solids content | wt % | 23.2 |
| Solids-rich stream from hydrocyclone 26: | | |
| Line 38 liquid flow | kg/h | 17650 |
| Line 38 solid flow | kg/h | 20000 |
| Line 38 solids content | wt % | 53.1 |
| Diluent-rich Reactor 2 recycle from hydrocyclone 24: | | |
| Line 28 liquid flow | kg/h | 22550 |
| Line 28 solid flow | kg/h | 6800 |
| Line 28 solids content | wt % | 23.2 |
| Solids-rich stream from hydrocyclone 24: | | |
| Line 36 liquid flow | kg/h | 17650 |
| Line 36 solid flow | kg/h | 20000 |
| Line 36 solids content | wt % | 53.1 |
| Combined solids-rich streams from hydrocyclones: | | |
| Total liquid flow | kg/h | 35300 |
| Total solid flow | kg/h | 40000 |
| Total solids content | wt % | 53.1 |

This case demonstrates the flexibility offered by the present invention. The same solids concentration is reached in the solids-rich stream as in the previous Examples, but in this example the fresh diluent added is significantly higher than the minimum limit, which means that there is still the possibility of changing the flow by reducing the amount of fresh diluent added. In other words, the solids concentration in the solids-rich stream in this Example is not the maximum possible, unlike in Examples 1 and 2.

Example 4

This case is similar to Example 3, except that the amount of fresh diluent added to each reactor is reduced from almost 17000 kg/h to about 9000 kg/h.

TABLE 4

| | | |
|---|---|---|
| Reactor 1 diluent input flow 8 | kg/h | 9080 |
| Reactor 1 solids content | wt % | 40.0 |
| Reactor 1 production rate | kg/h | 20000 |
| Line 12 liquid flow | kg/h | 47490 |
| Line 12 solid flow | kg/h | 31660 |
| Reactor 2 diluent input flow 16 | kg/h | 9080 |
| Reactor 2 solids content | wt % | 40.0 |
| Reactor 2 production rate | kg/h | 20000 |
| Line 20 liquid flow | kg/h | 47490 |
| Line 20 solid flow | kg/h | 31660 |
| Line 20 solids content | wt % | 40.0 |
| Line 22 liquid flow | kg/h | 47490 |
| Line 22 solid flow | kg/h | 31660 |
| Line 22 solids content | wt % | 40.0 |
| Diluent-rich Reactor 1 recycle from hydrocyclone 26: | | |
| Line 32 liquid flow | kg/h | 38030 |
| Line 32 solid flow | kg/h | 11660 |
| Line 32 solids content | wt % | 23.5 |
| Solids-rich stream from hydrocyclone 26: | | |
| Line 38 liquid flow | kg/h | 9460 |
| Line 38 solid flow | kg/h | 20000 |
| Line 38 solids content | wt % | 67.9 |
| Diluent-rich Reactor 2 recycle from hydrocyclone 24: | | |
| Line 28 liquid flow | kg/h | 38030 |
| Line 28 solid flow | kg/h | 11660 |
| Line 28 solids content | wt % | 23.5 |
| Solids-rich stream from hydrocyclone 24: | | |
| Line 36 liquid flow | kg/h | 9460 |
| Line 36 solid flow | kg/h | 20000 |
| Line 36 solids content | wt % | 67.9 |
| Combined solids-rich streams from hydrocyclones: | | |
| Total liquid flow | kg/h | 18920 |
| Total solid flow | kg/h | 40000 |
| Total solids content | wt % | 67.9 |

This case shows that by reducing the amount of fresh diluent added, the maximum possible limit of the solids concentration in the solids-rich stream (68 wt %) is reached without reaching the minimum limit on fresh diluent which can be added to the reactors (5000 kg/h).

Comparing Examples 1, 2 and 4 highlights the benefit of the present invention. With the same arrangement, simply by sending the diluent-rich stream to both reactors instead of only to one it is possible to increase the solid concentration of the solids-rich stream from 53.1 wt % to 68 wt %.

It is important to note that those examples are based on a simplified configuration. The production may in reality not be the same in both reactors. Additionally, some comonomer is generally fed to the reactors. But in any case the benefit of this invention is still observed. The present invention also includes the possibility to split the recycle flow between the two reactors unevenly (rather than 50-50 as in Examples 3 and 4), which provides additional flexibility. This is particularly useful if the two reactors have different solids concentrations, or production rates, or different extra diluent limitations.

The invention claimed is:

1. Continuous process for manufacturing a polyolefin resin in at least two reactors in series, in which:
   in a first polymerisation reactor, an olefin is polymerised continuously in the presence of a catalyst and a diluent to produce a first suspension comprising the diluent and polyolefin particles;
   at least a portion of said first suspension is transferred from the first polymerisation reactor to a second polymerisation reactor where further polymerisation takes place;
   a further suspension comprising diluent and polymer particles is withdrawn from the second reactor and transferred to two separators, in each of which separators a diluent-rich flow and a concentrated suspension of polyolefin particles are formed and separated,
   wherein the diluent-rich flow from one separator is recycled to a reactor preceding the second reactor, and the diluent-rich flow from the other separator is recycled to the second reactor.

2. Process according to claim 1, wherein part of the diluent-rich flow is recycled to the first reactor, and part of the diluent-rich flow is recycled to the second reactor.

3. Process according to claim 1, wherein all of the diluent-rich flow not recycled to a reactor preceding the second reactor is recycled to the second reactor.

4. Process according to claim 1, wherein one or more of the separators is a hydrocyclone separator.

5. Process according to claim 1, wherein the proportion of polyolefin particles recycled into the reactor preceding the second reactor is at least 2% by weight relative to the total weight of polyolefin particles transferred from the first reactor to the second reactor.

6. Process according to claim 1, wherein the proportion of polyolefin particles recycled into the second reactor is no more than 50% by weight relative to the total weight of polyolefin particles transferred from the first reactor to the second reactor.

7. Process according to claim 1, wherein the rate of addition of fresh diluent to each of the first and second reactors is at least 5 wt % of the rate of withdrawal of diluent from that reactor.

8. Process according to claim 1, wherein the rate of addition of recycled diluent (from the diluent-rich flow) to each of the first and second reactors is at least 20 wt % of the rate of withdrawal of diluent from that reactor.

9. Process according to claim 4, wherein every one of the separators is a hydrocyclone separator.

10. Process according to claim 5, wherein the proportion of polyolefin particles recycled into the reactor preceding the second reactor is at least 5% by weight relative to the total weight of polyolefin particles transferred from the first reactor to the second reactor.

11. Process according to claim 6, wherein the proportion of polyolefin particles recycled into the second reactor is no more than 40% by weight relative to the total weight of polyolefin particles transferred from the first reactor to the second reactor.

12. Process according to claim 7, wherein the rate of addition of fresh diluent to each of the first and second reactors is between 5 wt % and 10 wt %.

13. Process according to claim 8, wherein the rate of addition of recycled diluent (from the diluent-rich flow) to each of the first and second reactors is between 30 wt % and 95 wt %.

* * * * *